INVENTORS
PETER BALASCH
JOHN P. MILLEN

INVENTORS
PETER BALASCH
JOHN P. MILLEN

INVENTORS
PETER BALASCH
JOHN P. MILLEN

United States Patent Office 3,483,590
Patented Dec. 16, 1969

3,483,590
SKINNING MACHINE
Peter Balasch 5121 S. 48th St., and John P. Millen, 5124
S. 48th St., both of Omaha, Nebr. 68117
Filed Feb. 27, 1967, Ser. No. 618,614
Int. Cl. A22b 5/16
U.S. Cl. 17—21
8 Claims

ABSTRACT OF THE DISCLOSURE

A skinning machine for skinning the hide from an animal carcass having roller assemblies disposed outside of and under the skin and moving along the carcass to pull the skin loose.

Field of the invention

This invention is in the field of machines for pulling the hide away from the carcass of animals.

Description of the prior art

Skinning machines of the prior art now being used in the industry have the disadvantage that contaminated materials on the hide, such as dust and excrement, tend to be flung off the hide by the force of hide removal machines whereby this contaminating dust settles back on the carcass contaminating the meat.

One machine commonly used uses the principle of simply pulling the hide from the meat and the force of this is such that as the hide rips off, it snaps up in the air distributing contaminating dust throughout the room.

Another prior art machine pulls the hide off more gradually by applying an intermittent pulling force causing vibation, but the vibration itself shakes the contaminating materials from the side filling the air and contaminating the carcass.

Another disadvantage of the hide-pulling type of machine now in use is that they pull high amounts of fat from the carcass, as is undesirable. As much as ten pounds of fat have been known to cling to the hide in some cases, as represents a high loss of saleable meat. Such fat, if it remains on the carcass, forms part of the meat which sells at standard prices. But if the fat sticks to the hide, it brings a comparative pittance because it is useful only after being rendered for soap and other inedible uses.

An attempt was made in Patent No. 2,770,006, titled, Hide Stripping Devices, issued Nov. 13, 1956, to E.H. Wilkens, in which it was proposed to remove a calf hide by pulling it from the carcass with its free portions passing between chain-driven upper and lower pulling rollers. However, the small force that can practically be applied through such pulling rollers is so little that in this patent a knife was proposed to cut the inside of the hide from the carcass.

However, it is impossible to make a knife with its lower edge of the exact configuration of all parts of a carcass as the curvature of different parts varies.

It is an object of this invention to provide an elongated curved outer roller assembly in firm contact around the carcass at all points along the roller assembly.

Objectives of our invention

Our outer roller assembly provides curved surface means engaging the hide which is of a relatively larger diameter in a transverse cross section than the engaging means which the hide is pulled over in Patent No. 2,770,-006, thus minimizing damage to the hide and also minimizing consumption of power.

A second roller assembly disposed under a loosened portion of the hide protrudes farther from the sides of the carcass during skinning and moving longitudinally of the carcass in a direction that is away from an anchored end of the skin.

Our roller assemblies can be distributed flexibly in many different configurations for conforming to the varying curvatures of various parts of the animal.

It is an object to provide a skinning machine having an outside roller assembly disposed outside the carcass for holding the hide inwardly at one point and having a second roller assembly disposed beneath the skin and on that side of the outside roller on which hide-clamping means is disposed for clamping the loosened edge of skin, whereby as the roller assemblies move away from the anchoring means, the skin is pulled off.

Figure 1:
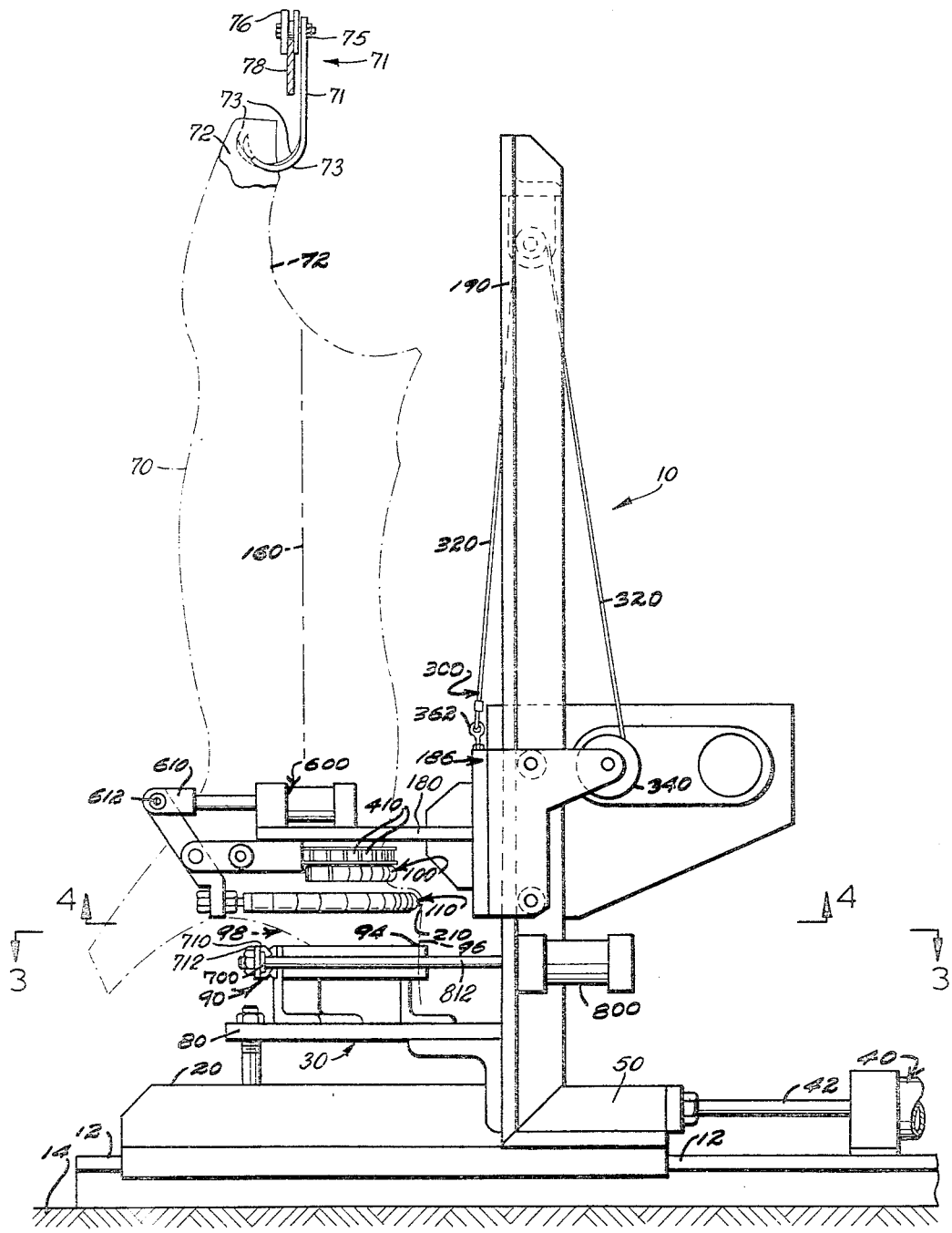
FIGURE 1 is a side elevation of the skinning machine of this invention showing the carcass partially in full and partially in dotted lines thereon, a conveyor track portion showing in section.
Figure 2:
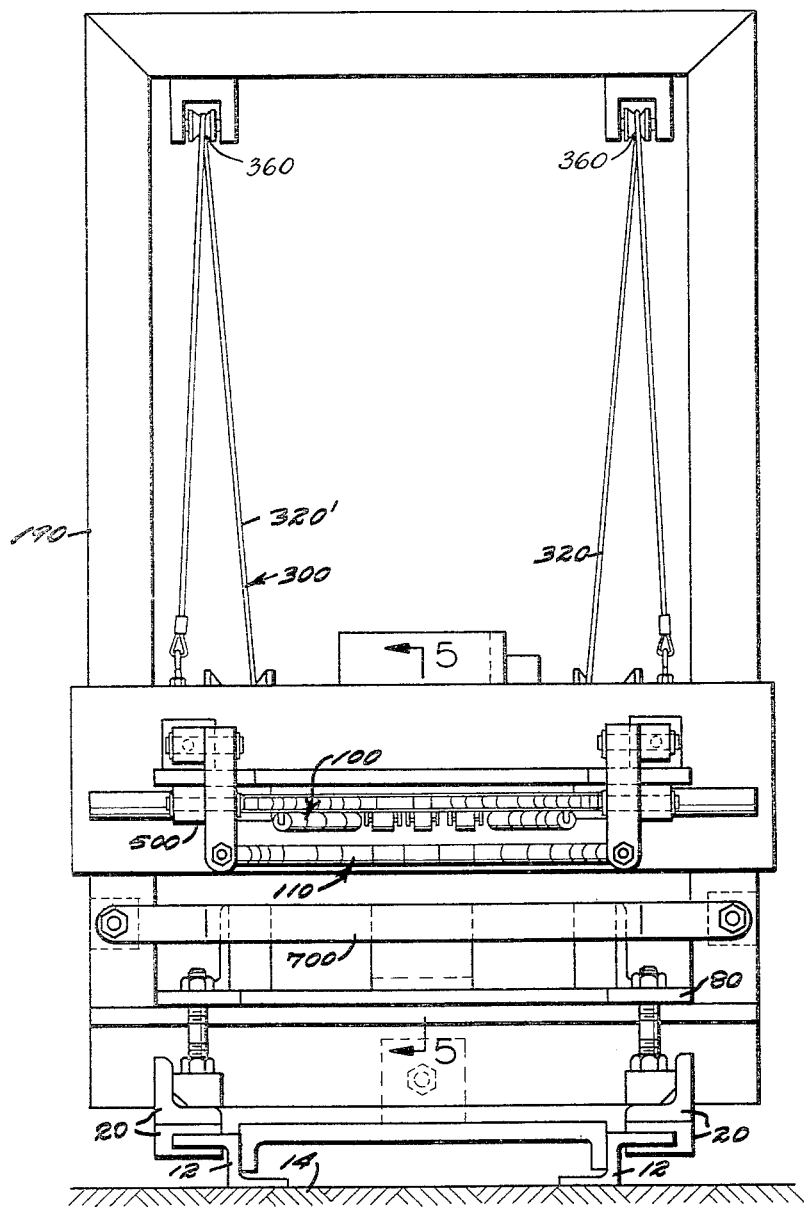
FIGURE 2 is a frontal elevation of the skinning machine of this invention.
Figure 3:
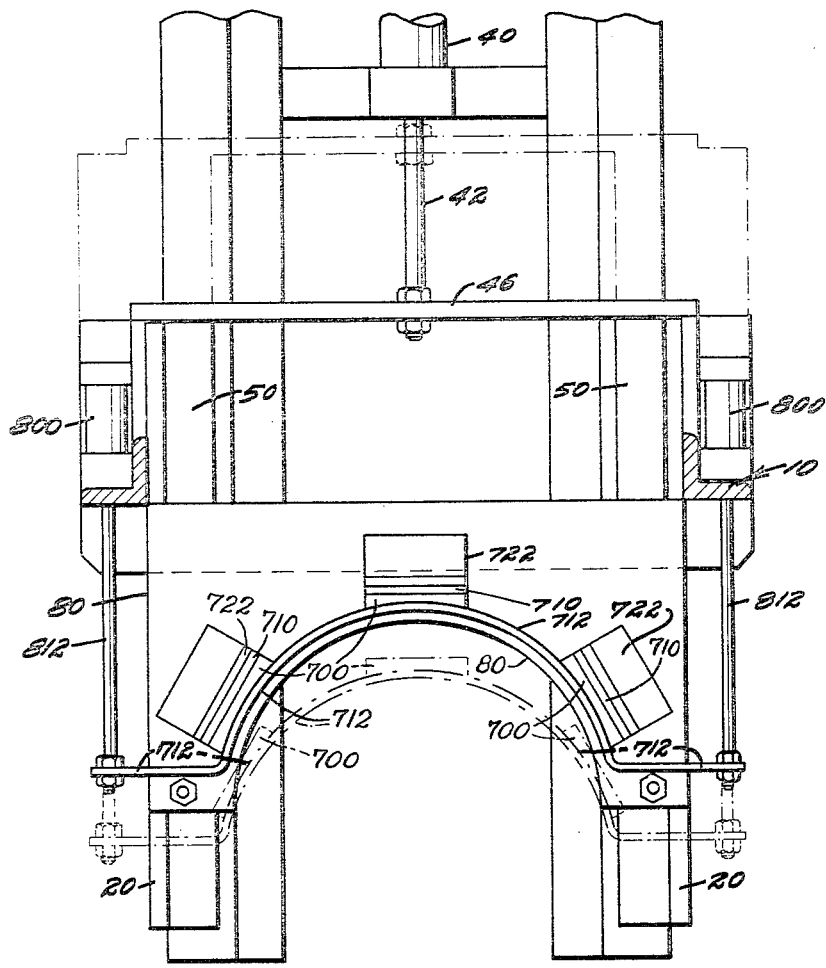
FIGURE 3 is a sectional view taken along the lines 3—3 of FIGURE 1, dotted lines in FIGURE 3 show an open position of a portion of the clamping means of this invention. Other dotted lines show selective positioning of a frame along the track.

The skinning machine of this invention is generally indicated in FIGURE 1 at 10 and comprises a pair of tracks 12 mounted on the floor 14 and on which the track follower portions 20 of a frame 30 are longitudinally slidable, such sliding being controlled by a hydraulic cylinder 40 seen in FIGURES 1 and 3 having a reciprocating shaft portion 42 attached by a bar 46 to portions 50 of the frame, which latter are attached to track followers 20, whereby operation of the hydraulic cylinder 40 will position the track followers 20 and the frame 30 to a conveyor, not shown, which latter is supporting a carcass 70, shown in dotted lines, by the hind legs 72 of the carcass whereby the carcass is suspended from a conveyor track 78 by suitable means, such as a conventional hook device 71, in a desired position with respect to this machine. The hook device 71 has two hooks 73, one to extend through each hind leg of the carcass. The upper ends of hooks 73 are attached to axle 75 of pulley roller 76 which travels horizontally on horizontal conveyor track 78. The hooks 73 are spaced apart along the track 78, as is conventional. The track 78 is shown in section in FIGURE 1.

A horizontal platform 80 mounted on the track followers 20 and frame 30 supports hide edge holding means generally indicated at 90 in the position for holding a lower terminal end portion 94 of a loosened segment 96 of a hide 98 to be removed from the carcass 70.

An elongated longitudinally curved outside engaging means 100 is provided for engaging the outside of the hide 98 in certain places in which the hide still clings to the carcass 70.

An elongated longitudinally curved inside engaging means 110 is disposed in use on the inside of the loosened portion 96 of the hide 98 and is disposed on the same side of the outside engaging means 100 as is the holding means 90.

Suitable engaging means mounting means generally indicated at 120 is attached to and supports the outside and inside engaging means 100 and 110 respectively. The arrangement is such that an imaginary line 160 can be drawn extending through a control part of the edge holding means 90 and through the arcs of the respective arcuate engaging means 100 and 110 so that the imaginary line 160 will extend through the elongated carcass 70 when the length of the carcass 70 is disposed along the line 160 with the line 160 extending approximately centrally through the carcass and at times when the loosened hide portion 96 is held in the edge holding means 90.

The mounting means 120 is movably mounted on the frame 10 for movement generally parallel to the imaginary line 160.

This movable mounting is accomplished by attaching a mounting plate 180 forming a part of the mounting means 120 to a track follower assembly 186 which latter is adapted to move vertically in following two track posts 190 of the frame 30, which latter extends vertically upward. As best seen in FIGURE 1, the inside engaging means 110 has its outer surface 210 offset a substantially greater distance laterally or horizontally of the imaginary line 160 than is the distance of offset from the line 160 of the inner surface 220 of the outside engaging means 100 as shown in greater detail in FIGURES 5 and 6.

This causes the hide to be pulled away from the carcass as the respective engaging means 100 and 110 are simultaneously moved away from the hide holding or clamping means 90.

This movement is accomplished by forcing means generally indicated at 300 for causing the mounting means 120 to be forcibly moved along the line 160 in a direction away from the hide holding means 90.

Figure 4:
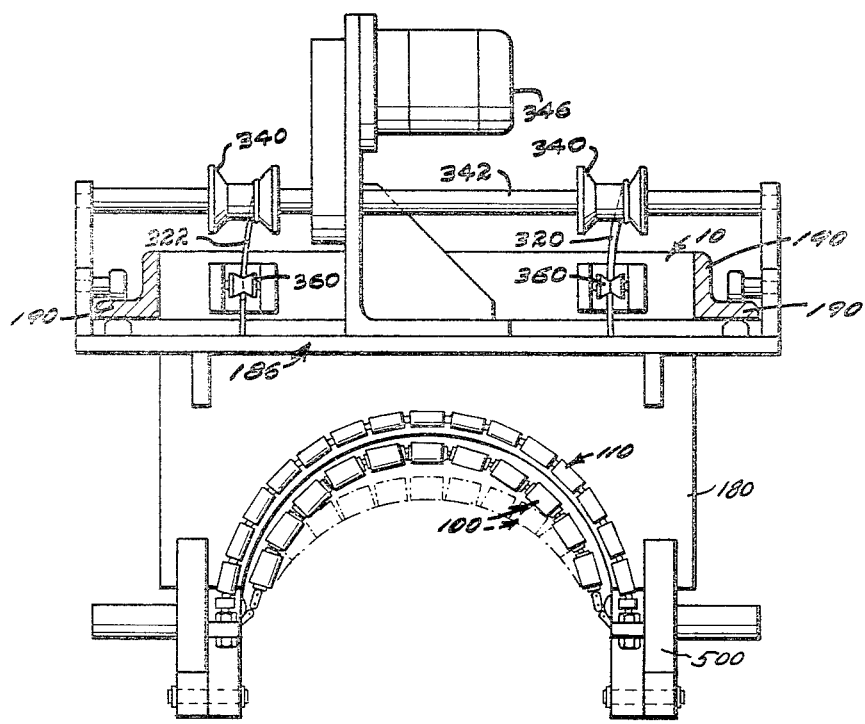
FIGURE 4 is a sectional view taken along the lines 4—4 of FIGURE 1, dotted lines showing optional positions of the flexible portion of an upper or outside engaging means.

The forcing means generally indicated at 300 comprises a pair of cable 320 and 320', which, as best seen in FIGURE 4, extend from winch pulleys 340 on shaft 342 driven by motor 346 upwardly over top pulleys 360 attached to the frame 10 and then downwardly to connection at 362 on the post following assembly 186, whereby the motor 346 raises and lowers the engaging means mounting assembly or means 120.

The inside engaging means 110 and outside engaging means 100 each have central portions defining substantially an arc for extending around portions of the carcass 70 in directions laterally of the length of the carcass.

The outside engaging means 100 is longitudinally flexible for conforming to the variations in the curvature of different portions of the carcass.

The inside engaging means 110 is longitudinally rigid for applying a force against the inner side of the loosened portion 96 of the hide.

Each of the engaging means 100 and 110, respectively, is attached to the mounting means 120 at the respective ends thereof, those portions of the inside engaging means 110 which extend along the arc thereof have an open space disposed along and between them and the outside engaging means 100 through which portions of loosened hide can pass without impediment.

Figure 5:
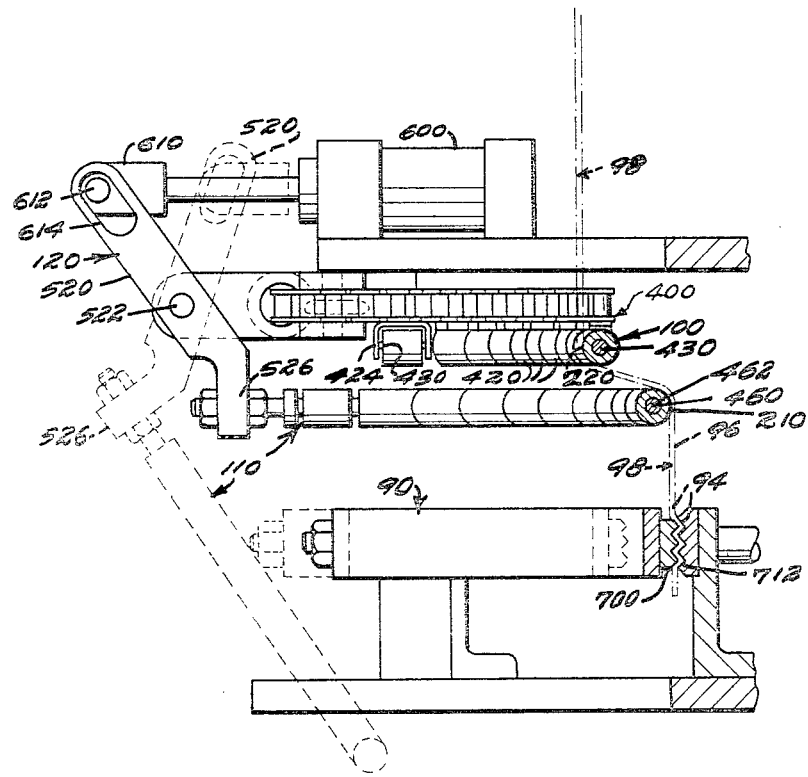
FIGURE 5 is a sectional view taken along the lines 5—5 of FIGURE 2, positions of a hide segment and an open position of an inside engaging means being shown in dotted lines.

As best seen in FIGURE 5, the outside engaging means 100 has an elongated flexible chain 400 having individual link units 410, further seen in FIGURE 1, which are pivotally attached together in the conventional manner of a sprocket chain. A plurality of rolers 420 is disposed beneath the chain 410 and U-shaped mounting elements 424 best seen in FIGURE 5 mount each of the rollers 420 on the link units 410 in a manner for rotation about an axis in alignment with that portion of the chain 400 which is disposed immediately above each roller 420 respectively, each axis extending horizontally through a respective roller axle 430. The axles 430 and U-shaped mounting members 424 both comprise parts of the mounting means 120 above described.

Suitable means attaches each roller mounting means 424 to a respective link portion 410 of the chain 400 which is disposed above the respective roller 420.

As best seen in FIGURE 5, the inside engaging means 110 has its outside surface 210 formed of the outermost parts of a plurality of rollers 450.

Suitable means such as an arcuate shaft is provided for rotatably supporting the rollers 450 in a manner such that each is mounted for rotation about an axis 462 which is approximately in alignment with the elongation of that portion of the arc of the inside engaging means 110 which the respective roller 450 is disposed on.

The mounting means 120, as best seen in FIGURE 5, comprises a rigid portion 500 fixed to the horizontal mounting plate 180 with ends of the chain 400 suitably attached to the rigid members 500 for accomplishing an anchoring.

The members 500 project forwardly and have a pair of spacer levers 520 attached thereto by means of pins 522 extending horizontally so that lower ends 526 of the levers 520 are adapted to move toward and away from the loosened portion 96 of the hide carrying with them the inside engaging means 110.

The inside engaging means 110 is of an arcuate shape having ends attached to the lower ends of the respective levers 520, as seen in FIGURE 5. A pair of hydraulic cylinders 600 are provided and controlled by means not shown, and have outer ends 610 carrying pins 612 which are slidably disposed in slots 614, as seen in FIGURE 5, the slots 614 being in the levers 520 respectively, whereby as the hydraulic cylinders 600 are simultaneosuly actuated, the levers 520 shift from dotted line to full line position, as shown in FIGURE 5, causing the inside engaging means 110 to swing from the dotted line position to the full line position of FIGURE 5, as is possible at a time when the inside engaging means 110 is at a vertical spacing from the hide holding means 90 greater than the spacing of engaging means 110 and holding means 90 as shown in FIGURE 5 so that there is no collision between inside engaging means 110 and holding means 90.

The hide holding means 90 has three spaced outer clamping surface means 700 which, as best seen in FIGURE 3, can be moved from a dotted line position to a full line position so as to be moved from an open to a clamping position for pressing toward an outside of the three inner hide clamping surface means 710 respectively, which latter are firmly mounted on three brackets 722 which are attached to a horizontal plate 80 earlier described.

A pair of clamping control hydraulic cylinders 800 are mounted on the frame 10 and the pistons 812 are attached to a carrier 712 of the three outside hide clamping surface means 710 so as to urge them toward the three inside hide clamping surface means 700 respectively for firmly clamping the hide therebetween as best seen in FIGURE 5.

In operation, the hide 98 is cut loose from a carcass 70 at the belly and back a sufficient distance on each side such that the loosened portion 96 of the hide thereby created can be inserted into and clamped into the edge holding means 90, as above described.

Figure 6:
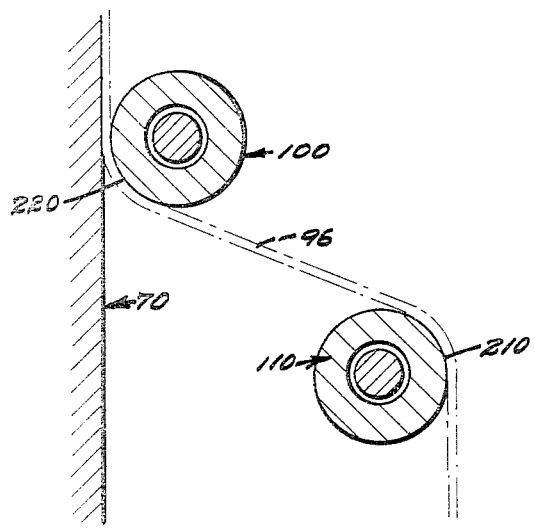
FIGURE 6 is a diagrammatic detail illustrating in simplicity the positions of carcass, hide, and outer and inner engaging means.

The hide is passed between the outside and inside engaging means 100 and 110 in a manner shown in FIGURES 5 and 6 and clamped. Thereafter, the hydraulic cylinder 600 is operated for placing the inside engaging means 110 in the position shown in FIGURE 5 to exert sufficient and proper pressure. Next, the forcing means 300 is operated for causing the engaging means mounting means or assembly 120 to move upwardly. This continues until all clinging portions of the hide are removed.

During this entire operation, the hide is kept secured and under control and is not snapping around in a manner such that contaminated materials, dirt, or excrement on its outer side could fly in the air.

For this reason, a much more sanitary removal is achieved. And the invention operates in a manner to fulfill the other objectives above set forth.

We claim:

1. A skinning machine comprising: a frame, edge holding means on said frame for holding a terminal end portion of a loosened segment of a hide to be removed from a carcass, carcass supporting means for supporting said carcass in a position for the said holding of said hide, an elongated longitudinally curved outside engaging means for engaging the outside of said hide in certain places in which said hide clings to said carcass, an elongated longitudinally curved inside engaging means disposed in use on the inside of said loosened portion of said hide and disposed on the same side of said outside engaging means as is the said holding means, engaging means mounting means attached to and supporting said outside and inside engaging means, the arrangement being such that an imaginary line can be drawn extending away from said edge holding means and through the arcs of said engaging means respectively so that said line will extend through an elongated carcass supported by said carcass supporting means and disposed along said line with its hide held in said edge holding means as described, said mounting means being movably mounted on said frame for movement generally parallel to said imaginary line, said inside engaging means having its outer surface offset a substantially greater distance laterally of said imaginary line than is the distance of offset from said line of the inner surface of said outside engaging means for causing said hide to be pulled away from said carcass as said engaging means are simultaneously moved away from said hide holding means, and forcing means for causing said mounting means to be forcibly moved along said line in a direction away from said hide holding means, said inside engaging means and said outside engaging means each defining substantially an arc for extending around portions of a carcass in directions laterally of its length, said outside engaging means being longitudinally flexible for conforming to the variations in the curvature of different portions of a carcass, said inside engaging means being longitudinally rigid for applying a force against the inner side of the loosened portion of the hide, each of said engaging means respectively having its ends attached to said mounting means, those portions of said inside engaging means which extend along the arc thereof having an open space disposed along and between them and said outside engaging means through which portions of loosened hide can pass without impediment.

2. The combination of claim 1 in which said outside engaging means comprises an elongated flexible chain having individual link units pivotally attached together, a plurality of rollers disposed beneath said chain, means mounting each of said rollers on said link units for rotation each about an axis in alignment with that portion of said chain which is disposed immediately above each roller respectively, and means for attaching each roller mounting means to a respective link portion of said chain disposed above the respective roller.

3. The combination of claim 1 in which said inside engaging means has its outermost surface formed of outermost parts of a plurality of inside engaging rollers, means for rotatably supporting said inside engaging rollers each for rotation about an axis approximately in alignment with the elongation of that portion of the arc of said inside engaging means which that respective inside engaging roller is disposed on.

4. The combination of claim 1 in further combination with said outside engaging means being disposed generally in a plane, longitudinal track means extending in parallelism with a second imaginary line at a right angle to said plane and extending through the area bounded by the arc of said arcuate outside engaging means, longitudinal track following means on said longitudinal track means and attached to said frame, and means for selectively securing said frame track following means in selected positions along said longitudinal track means.

5. The combination of claim 1 in which said edge holding means comprises clamping means having inner clamping surface means for pressing against the inner side of said hide, said edge holding means further having outer clamping surface means for pressing toward said inner clamping surface means for clamping said hide between said inner and outer clamping surface means, means for mounting said inner and outer clamping surface means for movement with respect to each other toward and away from each other, pressing means for pressing said inner and outer clamping surface means toward each other.

6. The combination of claim 5 in which said pressing means is power driven.

7. The combination of claim 1 in which said engaging means mounting means is adjustably constructed for the movement of said inside engaging means farther and less far from said imaginary line and with respect to said outside engaging means.

8. The combination of claim 7 in which power means is provided for forcibly positioning said inside engaging means at desired respective distances from said imagnary line farther and less far than said outside engaging means is from said imaginary line.

References Cited

UNITED STATES PATENTS

| | | | |
|---|---|---|---|
| 2,477,289 | 7/1949 | De Moss | 17—21 |
| 2,770,006 | 11/1956 | Wilkens | 17—21 |

LUCIE H. LAUDENSLAGER, Primary Examiner

U.S. Cl. X.R.

17—50